US011920368B2

(12) United States Patent
Franklin et al.

(10) Patent No.: US 11,920,368 B2
(45) Date of Patent: Mar. 5, 2024

(54) POOL SKIMMER GUARD ASSEMBLY

(71) Applicants: Michael Franklin, New Braunfels, TX (US); Chevone Franklin, New Braunfels, TX (US)

(72) Inventors: Michael Franklin, New Braunfels, TX (US); Chevone Franklin, New Braunfels, TX (US)

(*) Notice: Subject to any disclaimer, the term of this patent is extended or adjusted under 35 U.S.C. 154(b) by 182 days.

(21) Appl. No.: 17/582,794

(22) Filed: Jan. 24, 2022

(65) Prior Publication Data

US 2023/0235586 A1   Jul. 27, 2023

(51) Int. Cl.
*E04H 4/14* (2006.01)
*C02F 1/40* (2023.01)
*C02F 103/42* (2006.01)
*E04H 4/12* (2006.01)

(52) U.S. Cl.
CPC .............. *E04H 4/14* (2013.01); *C02F 1/40* (2013.01); *E04H 4/1272* (2013.01); *C02F 2103/42* (2013.01)

(58) Field of Classification Search
CPC ........ E04H 4/14; E04H 4/1272; E04H 4/1254
See application file for complete search history.

(56) References Cited

U.S. PATENT DOCUMENTS

| | | | |
|---|---|---|---|
| 3,093,582 A * | 6/1963 | Compton | E02B 11/005 49/463 |
| 5,935,450 A | 8/1999 | Benedict | |
| 6,817,041 B1 | 11/2004 | Evans | |
| 7,052,602 B2 * | 5/2006 | Boggs | E04H 4/1272 210/232 |
| 10,676,948 B1 | 6/2020 | Nash, Sr. | |
| 2005/0055898 A1 * | 3/2005 | Georgeff | E04H 4/1272 52/169.6 |
| 2008/0230453 A1 * | 9/2008 | Szymczak | E04H 4/1218 4/490 |
| 2013/0186812 A1 * | 7/2013 | Fitzpatrick | E04H 4/1254 210/167.19 |

* cited by examiner

*Primary Examiner* — Christine J Skubinna

(57) ABSTRACT

A pool skimmer guard assembly for keeping a pool skimmer free from obstructions includes a rod that is comprised of a resiliently bendable material. In this way the rod can be bent into a U-shape. Thus, the rod can be positioned in an intake of a pool skimmer having the rod curving outwardly from the intake. A pair of grips is each coupled to the rod such that each of the grips is positioned in the intake of the pool skimmer when the rod is bent into the U-shape. Each of the grips has a gripping edge that is perpendicularly oriented with the rod. In this way the gripping edge of each of the grips can engage a respective edge of the intake thereby inhibiting the rod from being dislodged from the intake.

9 Claims, 4 Drawing Sheets

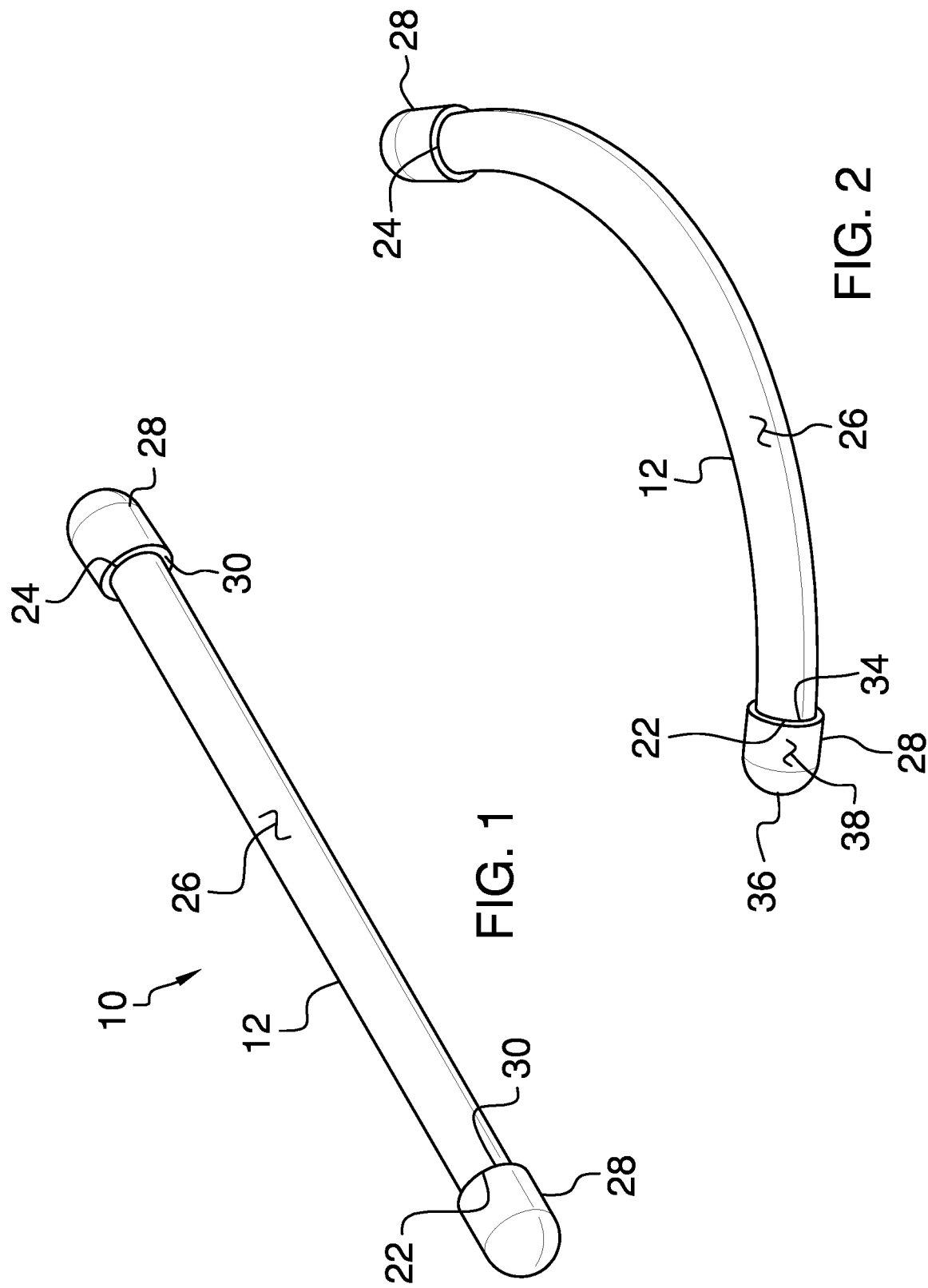

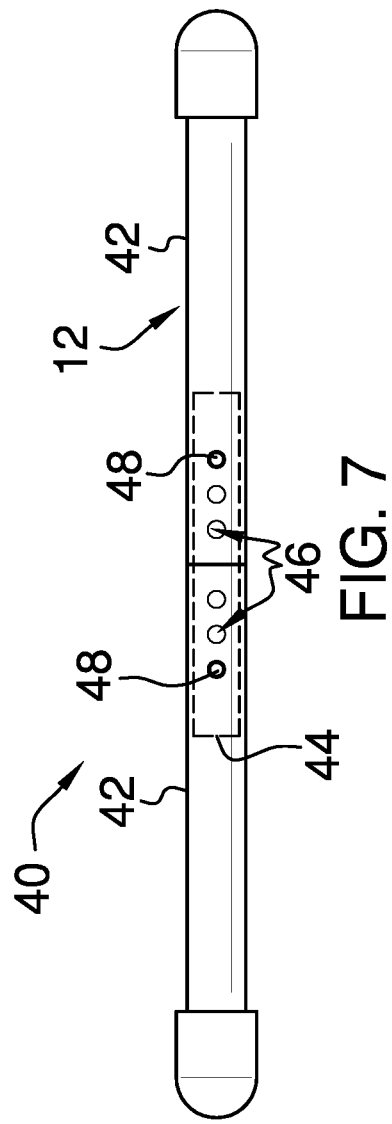
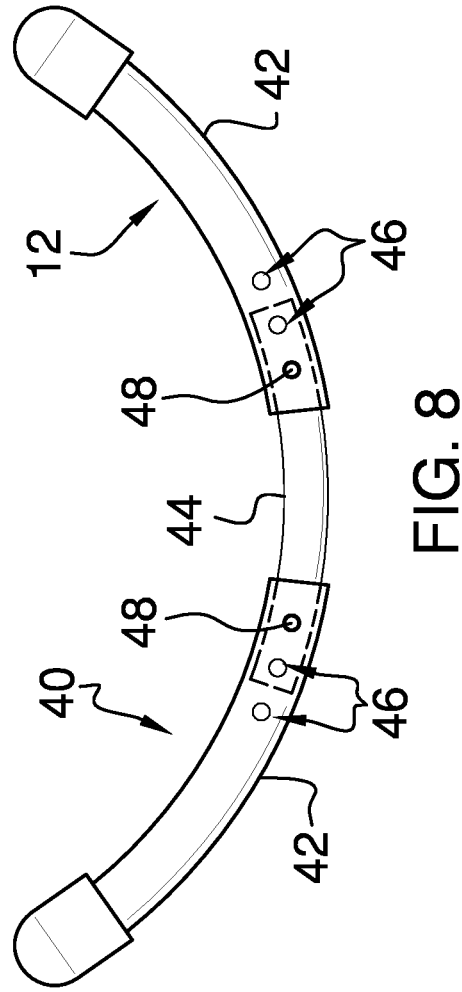

POOL SKIMMER GUARD ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to skimmer guard devices and more particularly pertains to a new skimmer guard device for keeping a pool skimmer free from obstructions. The device includes a resiliently bendable rod that can be bent into a U-shape for positioning the rod in an intake of a pool skimmer. The device includes a pair of grips that are each disposed on opposing ends of the rod. Each of the grips frictionally engages the intake for retaining the rod in the intake. In this way the rod curves outwardly from the intake to inhibit floating objects from being sucked into the intake.

(2) Description of Related Art Including Information Disclosed Under 37 CFR 1.97 and 1.98

The prior art relates to skimmer guard devices including a mesh cage that is attachable to a pool skimmer intake for inhibiting floating objects from being sucked into the intake. The prior art discloses a pool skimmer barrier that includes a plurality of undulating members that extend between a pair of brackets for positioning in front of a pool skimmer intake. The prior art discloses a pool skimmer barrier that includes a grate that is positionable in front of a pool skimmer intake. The prior art discloses a variety of curved screens that is positionable in front of a pool skimmer intake. The prior art discloses a foraminous panel that is positionable in front of a pool skimmer intake.

BRIEF SUMMARY OF THE INVENTION

An embodiment of the disclosure meets the needs presented above by generally comprising a rod that is comprised of a resiliently bendable material. In this way the rod can be bent into a U-shape. Thus, the rod can be positioned in an intake of a pool skimmer having the rod curving outwardly from the intake. A pair of grips is each coupled to the rod such that each of the grips is positioned in the intake of the pool skimmer when the rod is bent into the U-shape. Each of the grips has a gripping edge that is perpendicularly oriented with the rod. In this way the gripping edge of each of the grips can engage a respective edge of the intake thereby inhibiting the rod from being dislodged from the intake.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 1 is a perspective view of a pool skimmer guard assembly according to an embodiment of the disclosure.

FIG. 2 is a perspective view of an embodiment of the disclosure being bent into a U-shape.

FIG. 7 is a top phantom view of an alternative embodiment of the disclosure.

FIG. 8 is a top phantom view of an alternative embodiment of the disclosure showing a rod in an extended orientation.

DETAILED DESCRIPTION OF THE INVENTION

Figure 3:
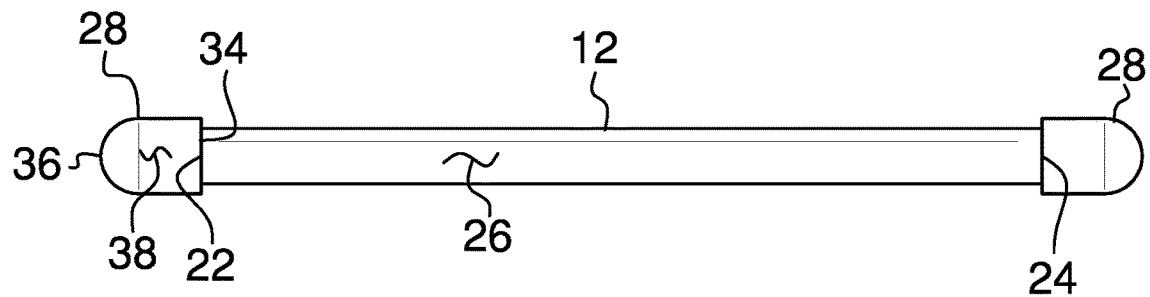
FIG. 3 is a top view of an embodiment of the disclosure.
Figure 4:
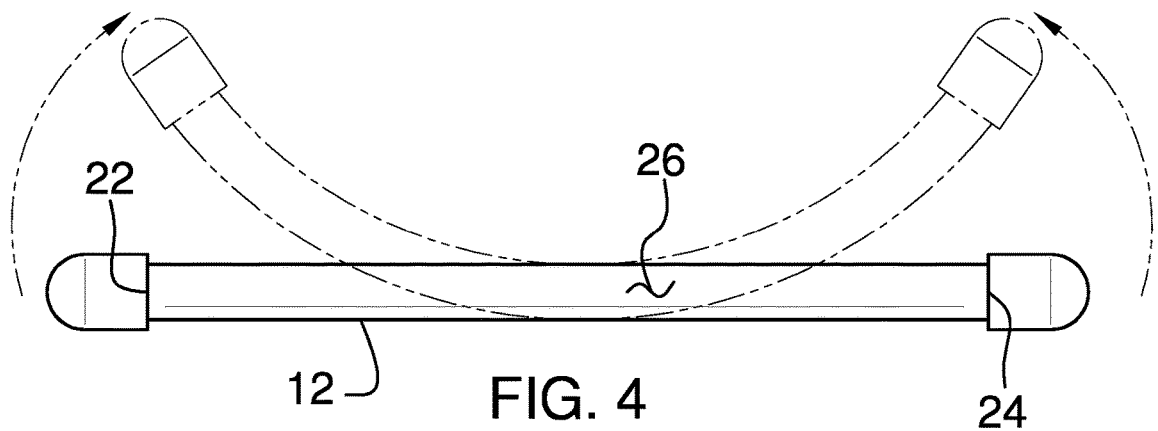
FIG. 4 is a top view of an embodiment of the disclosure being bent into a U-shape.
Figure 5:
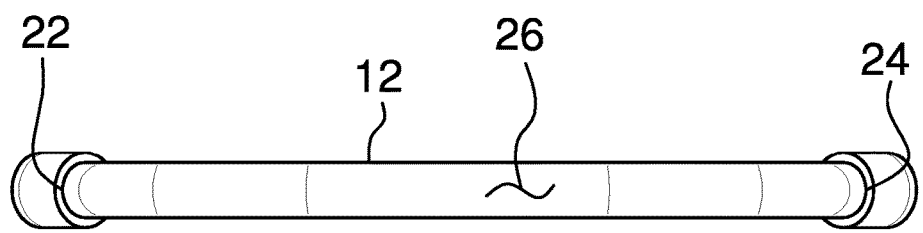
FIG. 5 is a front view of an embodiment of the disclosure.
Figure 6:
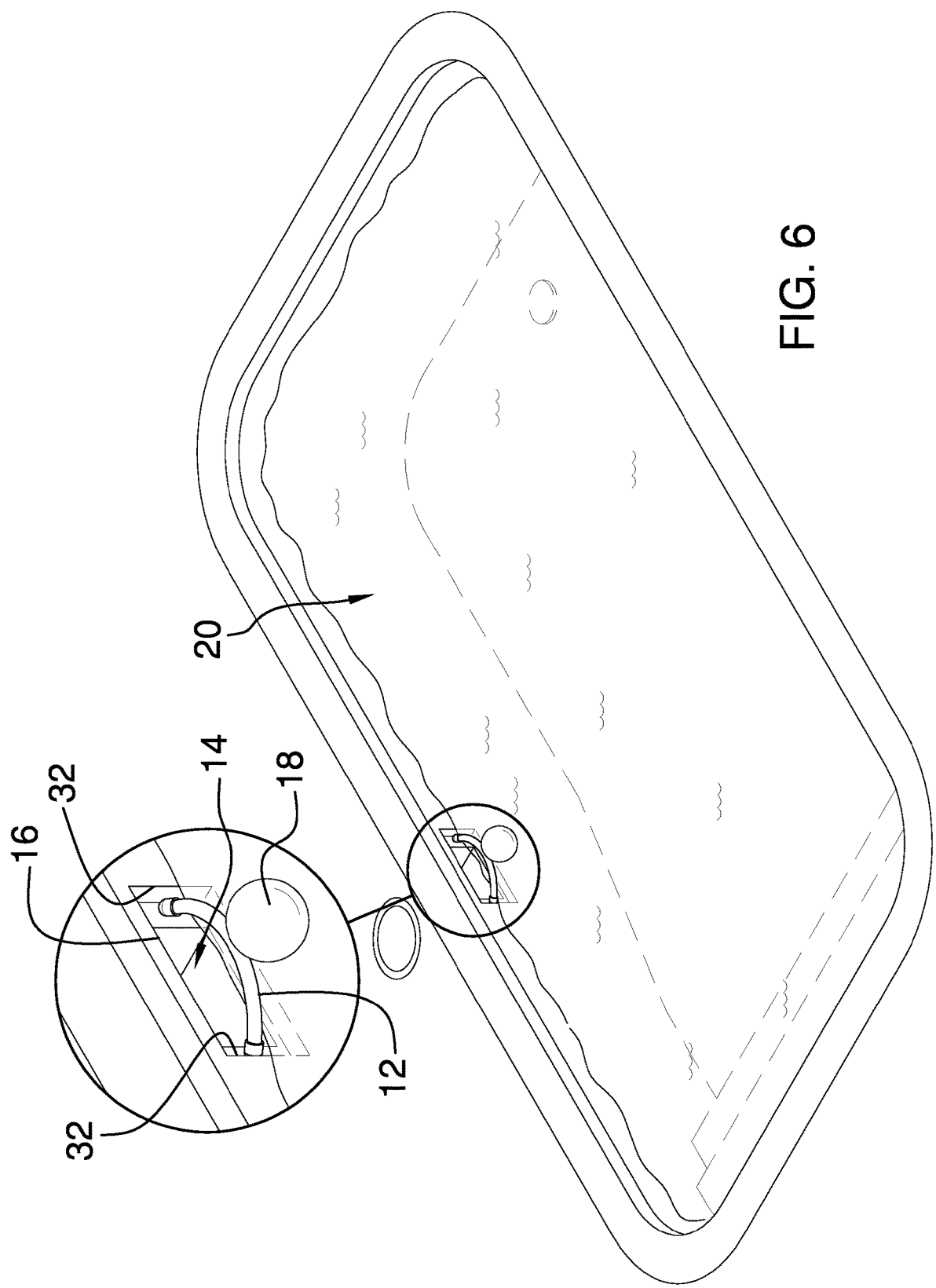
FIG. 6 is a perspective in-use view of an embodiment of the disclosure.

With reference now to the drawings, and in particular to FIGS. 1 through 8 thereof, a new skimmer guard device embodying the principles and concepts of an embodiment of the disclosure and generally designated by the reference numeral 10 will be described.

As best illustrated in FIGS. 1 through 8, the pool skimmer guard assembly 10 generally comprises a rod 12 that is comprised of a resiliently bendable material thereby facilitating the rod 12 to be bent into a U-shape. In this way the rod 12 can be positioned in an intake 14 of a pool skimmer 16 having the rod 12 curving outwardly from the intake 14 up to 0.5 inches above the water. In this way the rod 12 can inhibit floating objects 18 in a swimming pool 20 from being sucked into the intake 14 of the pool skimmer 16 while still allowing debris to enter the pool skimmer for keeping the pool cleaned. The rod 12 is comprised of a buoyant material thereby facilitating the rod 12 to float in water.

The rod 12 has a first end 22, a second end 24 and an outside surface 26 extending between the first end 22 and the second end 24, and the rod 12 is elongated between the first end 22 and the second end 24. The rod 12 may have a length ranging between approximately 12.0 inches and 24.0 inches and the rod 12 may have a diameter ranging between approximately 1.0 inches and 2.0 inches. The swimming pool 20 may be an above ground swimming pool or a below ground swimming pool and the pool skimmer 16 may be a pool skimmer of any conventional design that has an intake that extends through a bounding wall of the swimming pool.

A pair of grips 28 is provided and each of the grips 28 is coupled to the rod 12. In this way each of the grips 28 can be positioned in the intake 14 of the pool skimmer 16 when the rod 12 is bent into the U-shape. Each of the grips 28 has a gripping edge 30 that is perpendicularly oriented with the rod 12. In this way the gripping edge 30 of each of the grips 28 can engage a respective edge 32 of the intake 14 thereby inhibiting the rod 12 from being dislodged from the intake 14.

Each of the grips 28 has a primary end 34, a secondary end 36 and an outer surface 38 extending between the primary end 34 and the secondary end 36. The outer surface 38 of each of the grips 28 is continuously arcuate about an axis extending between the primary end 34 and the secondary end 36 such that each of the grips 28 has a cylindrical shape. The primary end 34 of each of the grips 28 is flattened and the secondary end 36 of each of the grips 28 is rounded. The primary end 34 of each of the grips 28 is coupled to a respective one of the first end 22 and the second end 24 of the rod 12.

The primary end 34 of each of the grips 28 has a diameter that is greater than a diameter of the rod 12. In this way the gripping edge 30 of each of the grips 28 is defined on the primary end 34 of the grips 28 that is exposed between the outside surface 26 of the rod 12 and the outer surface 38 of the grips 28. The gripping edge 30 defined on the primary end 34 of each of the grips 28 lies on a plane that is perpendicularly oriented with the outside surface 26 of the rod 12. Each of the grips 28 may be comprised of a resiliently compressible material, including but not being limited to, rubber or silicone. In this way the outer surface 38 of the grips 28 can frictionally engage the respective edge 32 of the intake 14 in the event that the gripping edge 30 is not able to engage the respective edge 32 of the intake 14.

In an alternative embodiment 40 as is most clearly shown in FIGS. 7 and 8, the rod 12 comprises a pair of outward sections 42 that each slidably receives a central section 44 such that the rod 12 has a telescopically adjustable length. Each of the outward sections 42 has a plurality of holes 46 each extending through the outward sections 42. The central section 44 includes a pair of locks 48 each being movably disposed on the central section 44. Each of the locks 48 engages a respective one of the holes 46 in a respective one of the outward sections 42 for adjusting a length of the rod 12.

In use, the rod 12 is bent into a U-shape and each of the grips 28 is inserted into the intake 14 of the pool skimmer 16. The rod 12 is released such that each of the grips 28 is biased to abut the respective edge 32 of the intake 14. In this way the rod 12 curves outwardly from the intake 14 for blocking floating objects 18, such as pool noodles or other pool toys, from being sucked into the intake 14. Thus, the pool skimmer 16 can function normally without being obstructed by the floating objects 18 that would otherwise be sucked into the intake 14. The rod 12 can be positioned such that the rod 12 is spaced approximately 0.5 inches above the surface of the water to facilitate floating objects to be blocked and debris floating on the water to enter the pool skimmer 16. Moreover, the grips 28 retain the rod 12 in the desired location in the intake 14 by frictionally engaging the respective edge 32 of the intake 14.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A pool skimmer guard assembly for inhibiting objects from being sucked into a pool skimmer, said assembly comprising:

a rod being comprised of a resiliently bendable material thereby facilitating said rod to be bend into a U-shape wherein said rod is configured to be positioned in an intake of a pool skimmer having said rod curving outwardly from the intake, said rod being comprised of a buoyant material thereby facilitating said rod to float in water wherein said rod is configured to inhibit floating objects in the swimming pool from being sucked into the intake of the pool skimmer;

a pair of grips, each of said grips being coupled to said rod wherein each of said grips is configured to be positioned in the intake of the pool skimmer when said rod is bent into said U-shape, each of said grips having a gripping edge being perpendicularly oriented with said rod wherein said gripping edge of each of said grips is configured to engage a respective edge of the intake thereby inhibiting said rod from being dislodged from the intake, wherein each of said grips has a primary end, a secondary end and an outer surface extending between said primary end and said secondary end, said outer surface of each of said grips being continuously arcuate about an axis extending between said primary end and said secondary end such that each of said grips has a cylindrical shape;

wherein said rod has a first end, a second end and an outside surface extending between said first end and said second end, said rod being elongated between said first end and said second end;

wherein said primary end of each of said grips is coupled to a respective one of said first end and said second end of said rod; and wherein said primary end of each of said grips has a diameter being greater than a diameter of said rod such that said gripping edge of each of said grips is defined on said primary end of said grips that is exposed between said outside surface of said rod and said outer surface of said grips.

2. The assembly according to claim 1, wherein said primary end of each of said grips is flattened.

3. The assembly according to claim 1, wherein said secondary end of each of said grips is rounded.

4. The assembly according to claim 1, wherein said gripping edge defined on said primary end of each of said grips lies on a plane being perpendicularly oriented with said outside surface of said rod.

5. A pool skimmer guard assembly for inhibiting objects from being sucked into a pool skimmer, said assembly comprising:
 a rod being comprised of a resiliently bendable material thereby facilitating said rod to be bend into a U-shape wherein said rod is configured to be positioned in an intake of a pool skimmer having said rod curving outwardly from the intake, said rod being comprised of a buoyant material thereby facilitating said rod to float in water wherein said rod is configured to inhibit floating objects in the swimming pool from being sucked into the intake of the pool skimmer, said rod having a first end, a second end and an outside surface extending between said first end and said second end, said rod being elongated between said first end and said second end; and
 a pair of grips, each of said grips being coupled to said rod wherein each of said grips is configured to be positioned in the intake of the pool skimmer when said rod is bent into said L-shape, each of said grips having a gripping edge being perpendicularly oriented with said rod wherein said gripping edge of each of said grips is configured to engage a respective edge of the intake thereby inhibiting said rod from being dislodged from the intake, each of said grips having a primary end, a secondary end and an outer surface extending between said primary end and said secondary end, said outer surface of each of said grips being continuously arcuate about an axis extending between said primary end and said secondary end such that each of said grips has a cylindrical shape, said primary end of each of said grips being flattened, said secondary end of each of said grips being rounded, said primary end of each of said grips being coupled to a respective one of said first end and said second end of said rod, said primary end of each of said grips having a diameter being greater than a diameter of said rod such that said gripping edge of each of said grips is defined on said primary end of said grips that is exposed between said outside surface of said rod and said outer surface of said grips, said gripping edge defined on said primary end of each of said grips lying on a plane being perpendicularly oriented with said outside surface of said rod.

6. The assembly according to claim 5, wherein said rod comprises a pair of outward sections that each slidably receives a central section such that said rod has a telescopically adjustable length.

7. The assembly according to claim 6, wherein each of said outward sections has a plurality of holes each extending through said outward sections.

8. The assembly according to claim 7, wherein said central section includes a pair of locks each being movably disposed on said central section, each of said locks engaging a respective one of said holes in a respective one of said outward sections for adjusting a length of said rod.

9. A pool skimmer guard system for inhibiting objects from being sucked into a pool skimmer, said system comprising:
 a swimming pool having a pool skimmer, said pool skimmer having an intake, said intake having a bounding edge, said bounding edge having a first lateral side and a second lateral side;
 a rod being comprised of a resiliently bendable material thereby facilitating said rod to be bend into a U-shape such that said rod is positionable in said intake of said pool skimmer having said rod curving outwardly from said intake, said rod being comprised of a buoyant material thereby facilitating said rod to float in water wherein said rod is configured to inhibit floating objects in the swimming pool from being sucked into said intake of said pool skimmer, said rod having a first end, a second end and an outside surface extending between said first end and said second end, said rod being elongated between said first end and said second end; and
 a pair of grips, each of said grips being coupled to said rod such that each of said grips is positionable in said intake of said pool skimmer when said rod is bent into said U-shape, each of said grips having a gripping edge being perpendicularly oriented with said rod, said gripping edge of each of said grips engaging a respective one of said first lateral side and said second lateral side of said bounding edge of said intake thereby inhibiting said rod from being dislodged from said intake, each of said grips having a primary end, a secondary end and an outer surface extending between said primary end and said secondary end, said outer surface of each of said grips being continuously arcuate about an axis extending between said primary end and said secondary end such that each of said grips has a cylindrical shape, said primary end of each of said grips being flattened, said secondary end of each of said grips being rounded, said primary end of each of said grips being coupled to a respective one of said first end and said second end of said rod, said primary end of each of said grips having a diameter being greater than a diameter of said rod such that said gripping edge of each of said grips is defined on said primary end of said grips that is exposed between said outside surface of said rod and said outer surface of said grips, said gripping edge defined on said primary end of each of said grips lying on a plane being perpendicularly oriented with said outside surface of said rod.

\* \* \* \* \*